United States Patent [19]

Terada

[11] 4,296,966
[45] Oct. 27, 1981

[54] SEAT FOR AN AUTOMOTIVE VEHICLE

[75] Inventor: Takami Terada, Toyota, Japan

[73] Assignees: Aisin Seiki Kabushiki Kaisha, Kariya; Shatai Kogyo Kabushiki Kaisha, Yamato, both of Japan

[21] Appl. No.: 81,459

[22] Filed: Oct. 3, 1979

[30] Foreign Application Priority Data

Oct. 18, 1978 [JP] Japan ................... 53-128944

[51] Int. Cl.³ .................................. A47C 1/025
[52] U.S. Cl. .................................. 297/369; 297/355
[58] Field of Search ................ 297/369, 366–368, 297/370, 371, 354, 355

[56] References Cited

U.S. PATENT DOCUMENTS

| 2,576,343 | 11/1951 | Hibbard et al. | 297/361 X |
| 3,481,646 | 12/1969 | Tabor | 297/367 X |
| 3,736,025 | 5/1973 | Ziegler et al. | 297/369 |
| 3,968,993 | 7/1976 | Doyle | 297/378 X |

Primary Examiner—William E. Lyddane
Attorney, Agent, or Firm—Oblon, Fisher, Spivak, McClelland & Maier

[57] ABSTRACT

This invention provides a mechanism for adjusting the angle of the seat back to the seat in which a four link mechanism is provided and a segmental gear and a manual handle cooperate for engagement with each other in locking the four link mechanism and hence the back in immovable position against a gravity of a passenger.

6 Claims, 2 Drawing Figures

SEAT FOR AN AUTOMOTIVE VEHICLE

BACKGROUND OF THE INVENTION

This invention relates to a seat for an automotive vehicle having an adjustable back and more particularly to an adjusting mechanism that permits the seat back to be adjusted from an upright sitting position to several selected positions of reclination.

It is desirable in the seat to provide the adjusting mechanism in a structurally simple and small form with sufficient strength and rigidity. This is particularly demanded in case of a truck seat since the same has usually smaller space to be assigned therein than any passenger car seat has.

It is a principal object of the present invention to provide a vehicle seat back adjusting mechanism of simple structure and small volume with a sufficient strength and rigidity, at light weight.

SUMMARY OF THE INVENTION

The foregoing object and others are attained according to at least one aspect of provision of the adjusting mechanism in multiple link mechanism form.

The embodiment of the present invention therefore comprises a seat having a back rest disposed tiltably relative to the seat and at least one adjusting mechanism for adjusting the angle of the back rest relative to the seat. The adjusting mechanism further comprises a first link pivoted at one end thereof to the back rest, a second link rotatably connected at one end thereof to the other end of the first link and further pivoted at the other end thereof to the seat, a latch means integrally extending from the second link and provided with an arcuate series of teeth concentric to the pivoting axis of the second link to the seat, a manual handle pivoted to a part of the adjusting mechanism and having a pin for engagement with the teeth of the latch means and spring means normally urging the manual handle toward engagement with the teeth of the latch means so that the adjusting mechanism is locked and hence the back rest is held in a selected position of reclination.

DESCRIPTION OF THE PREFERRED EMBODIMENT

Figure 1:
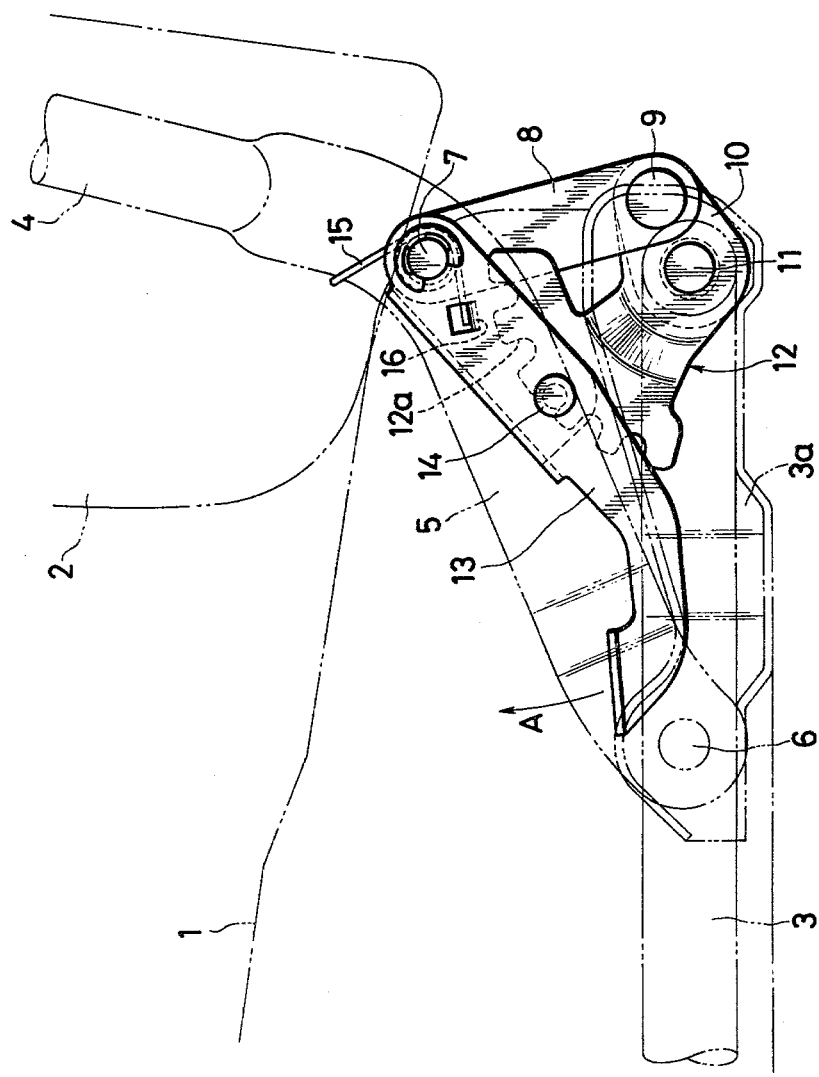
FIG. 1 is a side elevation of an adjusting mechanism according to the present invention.

Referring then to drawings, a frame for the seat 1 partially shown in phantom in FIG. 1 comprises a pair of spaced horizontally disposed parallel frame members 3 and 3′, herein shown as formed of tubular stock, to provide for rigidity at light weight, respectively supported above the floor of the vehicle. At rear ends of the frame members 3 and 3′ are fixed, by means of, for example welding technique, plates 3a and 3′a respectively. A back rest 2 shown also in phantom has a pair of parallel frame members 4 and 4′ likewise of tubular construction. The members 4 and 4′ have at the bottom ends flattened portions 5 and 5′ which are pivoted to the plates 3a and 3′a by means of pins 6 and 6′, respectively. Links 8 and 8′ are respectively pivoted to the collapsed portions 5 and 5′ at one end thereof by means of pins 7 and 7′, respectively. Second links 10 and 10′ are rotatably connected to the other ends of the first links 8 and 8′ by means of pins 9 and 9′, respectively. The second links 10 and 10′ are further pivoted respectively to the plates 3a and 3′a by means of a common long shaft 11 which spans between both sides of the seat 1 and is sufficiently massive against a twist as would otherwise be experienced when in use. It should be noted that the second links 10 and 10′ are fixed to the shaft 11 and the shaft 11 is rotatably supported by the plates 3a and 3′a, respectively. Still further, attention should be drawn to the fact that the second links 10 and 10′ are so fixed to the common shaft 11 that they lie in a plane in which lies the shaft 11.

From the foregoing, it will be noted that the members marked with the same numerals, one of them primed, are of identical dimension so that a pair of four link mechanisms are formed strictly in accord with each other at both sides of the seat 1 with exception that a latch 12 extends from the second link 10, as detailed hereinbelow.

Figure 2:
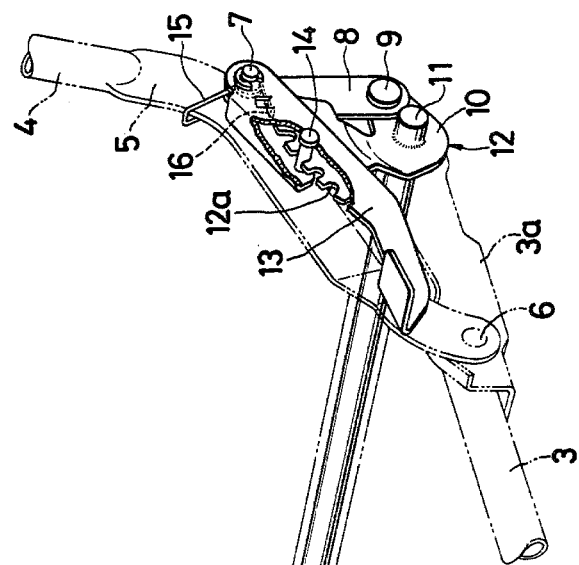
FIG. 2 is a perspective view of the mechanism of FIG. 1 in installed form in a vehicle.

The latch 12 has an arcuate series of teeth 12a for engagement with a manual handle 13 shown as pivoted to the collapsed portion 5 by means of the common pin 7. The handle 13 is of a channel form in part as shown in FIG. 2 to straddle the arcuate series of teeth 12a when installed. The handle 13 is provided with a pin 14 supported at both ends thereof by the walls of the channel form portion of the handle 13 and engageable with the teeth 12a medially of the length. A coiled torsion spring 15 is provided around the pin 7 with one end anchored to the collapsed portion 5 and the other end anchored to an inwardly luged portion 16 in the wall of the U-shaped portion of the handle 13, so that the pin 14 of the handle 13 is normally urged toward engagement with the teeth 12a.

FIGS. 1 and 2 show the locked position of the back rest 2, in which the back rest is secured against tilting. It is fixed through the pin 14 on the handle 13 engaging in the teeth 12a on the latch 12, whereby the second link 10 is prevented from rotation about the axis of the shaft 11 so that the movement of the first link 8 and hence the member 4 becomes impossible. Such immovable position is likewise takes place with other adjusting mechanism at the other side of the seat 1 by the action of the common shaft 11. This locked position is held by the bias of the torsion spring 15 thus causing the handle 13 to engage the teeth 12a as shown.

In order to move the back rest 2 either backwardly or forwardly, the handle 13 is pulled up against the bias of the torsion spring 15, sufficiently to enable the pin 14 on the handle 13 to disengage from the teeth 12a, so as to free the mechanisms for turning the back rest.

The link form locking or adjusting mechanism can beneficially provide maximum strength and rigidity for a given amount of metal material and operate smoothly without requiring any attention other than an occasional oiling.

By providing the mechanism at each side of the seat 1 in operatively connected condition, the back rest of the seat 1 is freed from any tendency to be twisted under a loaded condition caused by a passenger's gravity particularly when the vehicle suddenly starts or stops.

Further it is appreciable advantage of the invention that the latch 12 less necessitates the gauge of the sheet metal material and can abbreviate an expensive cementation hardening of the teeth 12a as would otherwise be required, by selecting a suitable ratio of the length of the second link 10 divided by the distance between the axis of the shaft 11 and the teeth 12a.

While the foregoing speaks only of a preferred embodiment, it should be understood that various modification will occure to those who are skilled in the art. Namely, the invention may be practiced in a form in which the seat is provided with the adjusting mechanism only at one side of the seat with the advantage of the small and simple construction and comparatively larger strength and rigidity of the adjusting mechanism. Therefore, the appended claims are to be construed to cover an equivalent falling within the true scope and spirit of the invention.

What is claimed is:

1. A seat for an automotive vehicle having a back rest disposed tiltably relative to said seat and at least one adjusting mechanism for adjusting the angle of said back rest relative to said seat, said back rest having a pair of parallel side frame portions which extend forwardly and downwardly from the lower end of the back rest and which are pivoted at the free ends thereof to said seat, said adjusting mechanism comprising a first link pivoted at one end thereof to one of said pair of parallel side frame portions at a point spaced from said pivoted free end, a second link rotatably connected at one end thereof to the other end of said first link and further pivoted at the other end thereof to said seat, a latch means integrally extending from said second link and provided with an arcuate series of teeth concentric to the pivoting axis of said second link to said seat, a manual handle pivoted to a part of said adjusting mechanism and having a pin for engagement with said teeth of said latch means and spring means normally urging said manual handle toward engagement with said teeth of said latch means so that said adjusting mechanism is locked and hence said back rest is locked in a selected position of reclination.

2. A seat for an automotive vehicle as set forth in claim 1 wherein, said manual handle is pivoted to said back rest by means of a common pin member together with said first link and said spring means is a coiled torsion spring and disposed around said common pin member with one end thereof anchored to said manual handle and the other end anchored to said back rest.

3. A seat for an automotive vehicle as set forth in claim 1 wherein, said seat comprises a pair of spaced horizontally disposed tubular frame members and said pair of spaced tubular frame portions of said back rest are pivoted to said frame members of said seat by means of pins.

4. A seat for an automotive vehicle as set forth in claim 3 wherein, said first link is pivoted at one end thereof to one of said frame portions of said back rest and said second link is pivoted at one end thereof to one of said frame members of said seat so that a four link mechanism is formed by said first and second links and parts respectively of said one of said frame portions of said back rest and said one of said frame members of said seat.

5. A seat for an automotive vehicle as set forth in claim 4 wherein a second four link mechanism is provided at the other side of said seat opposite to that at which said first four link mechanism is disposed, said second four link mechanism being formed of four members respectively of identical dimension with said first link, said second link, and said parts of said one of said frame portions of said back rest and said one of said frame members of said seat, said second link being pivoted to said one of said frame members of said seat by means of a shaft integral with said second link and rotatable relative to said one of said frame members of said seat, said shaft spanning a width of said seat for being rotatably supported at the other end thereof by the other one of said frame members of said seat and having secured thereto one of four members of said second four link mechanism corresponding to said second link and lying in an imaginary plane together with said second link so that said both four link mechanisms cooperate at both sides of said seat for tiltably supporting said back rest with respect to said seat.

6. A seat for an automotive vehicle as set forth in claim 1 wherein the distance between the axis of said shaft and said teeth is larger than the length of said second link for providing less moment of a force applied to said pin of said manual handle when the back rest is loaded by the passenger.

* * * * *